United States Patent [19]

Lamming et al.

[11] Patent Number: 5,539,665
[45] Date of Patent: Jul. 23, 1996

[54] RECORDING AND RETRIEVAL OF INFORMATION RELEVANT TO THE ACTIVITIES OF A USER

[75] Inventors: Michael G. Lamming; Michael J. Flynn, both of Cambridge, England

[73] Assignee: Xerox Corporation, Stamford, Conn.

[21] Appl. No.: 279,961

[22] Filed: Jul. 25, 1994

[30] Foreign Application Priority Data

Jul. 26, 1993 [GB] United Kingdom ............. 9315448

[51] Int. Cl.⁶ .................................................. G06F 17/40
[52] U.S. Cl. .......................... 364/514 R; 379/38; 379/49; 340/825.49
[58] Field of Search ............................. 364/514 R, 514 A, 364/514 B, 514 C; 379/38, 49; 340/825.49; 395/600

[56] References Cited

U.S. PATENT DOCUMENTS

| | | | |
|---|---|---|---|
| 4,275,385 | 6/1981 | White | 340/312 |
| 4,468,694 | 8/1984 | Edgar | 358/93 |
| 4,549,264 | 10/1985 | Carroll et al. | 364/406 |
| 4,658,357 | 4/1987 | Carroll et al. | 364/406 |
| 4,700,295 | 10/1987 | Kastof et al. | 364/401 |
| 4,837,568 | 6/1989 | Snaper | 340/825.54 |
| 4,952,928 | 8/1990 | Carroll et al. | 364/825.54 |
| 5,047,962 | 9/1991 | Cornish | 364/550 |
| 5,201,047 | 4/1993 | Maki et al. | 395/600 |
| 5,250,941 | 10/1993 | McGregor et al. | 340/825.65 |
| 5,297,279 | 3/1994 | Bannon et al. | 395/600 |
| 5,321,396 | 6/1994 | Lamming et al. | 340/825.49 |
| 5,327,144 | 7/1994 | Stilp et al. | 342/387 |
| 5,363,425 | 11/1994 | Mufti et al. | 379/38 |
| 5,396,227 | 3/1995 | Carroll et al. | 340/825.31 |

FOREIGN PATENT DOCUMENTS

| | | | |
|---|---|---|---|
| 175503 | 3/1986 | European Pat. Off. . | |
| 0357309 | 3/1990 | European Pat. Off. | G08B 26/00 |
| 495622 | 7/1992 | European Pat. Off. . | |
| 0495622 | 7/1992 | European Pat. Off. | G06F 15/401 |
| 568161 | 11/1993 | European Pat. Off. . | |
| 568480 | 11/1993 | European Pat. Off. . | |
| 2187317 | 9/1987 | United Kingdom | G07C 1/20 |
| 8501582 | 4/1985 | WIPO | G01S 1/00 |

OTHER PUBLICATIONS

European Search Report for Appl. No. EP 94305477.
Manandhar, S. "Activity Server: You can run but you can't hide." Proceedings of the Summer 1991 USENIX Conference, Nashville, TN, U.S.A., Jun. 10–14, 1991, Berkeley, CA, U.S.A., USENIX Assoc., U.S.A. pp. 299–311.
Want, R.; Hopper, A.; Falcao, V.; Gibbons, J. "The active Badge Location System." ACM Transactions on Information Systems, Jan. 1992, U.S.A., vol. 10, No. 1, ISSN 1046-8188. pp. 91–102.
Examiner's Search Report, U.K., Application No. GB9315448.2, Sep. 30, 1993.
Examiners Search Report, U.K., Application No. GB9315448.2, Apr. 27, 1994.

*Primary Examiner*—Emanuel T. Voeltz
*Assistant Examiner*—Patrick J. Assouad

[57] ABSTRACT

A method for the recording and retrieval of information relevant to the activities of a user. The invention may be employed to provide a memory prosthesis in the form of a highly portable device which records all kinds of information about the user's life, and provides a simple and rapid means of access to that information. The device receives and stores information from external sources, or objects, or from signal generators identifying specific machines, places, or people carrying other ones of the same type of device. Events comprising encounters between objects are recorded automatically, being time-stamped and stored chronologically, and a rapid search method for such a database is disclosed. The data can either be stored in the memory of the device itself, or, for better protection against failure, in a central data repository of the system, with a fail-safe backup.

14 Claims, 4 Drawing Sheets

TIME ⟶

RECORDING AND RETRIEVAL OF INFORMATION RELEVANT TO THE ACTIVITIES OF A USER

FIELD OF THE INVENTION

This invention relates to a system and method for the recording and retrieval of information relevant to the activities of the user. The invention is particularly suitable for implementation in the form of a memory aid device which is portable, and preferably wearable by the user.

BACKGROUND OF THE INVENTION

Memory problems are widespread but little has been done to exploit information technology to help. People have many procedures designed to compensate for their fallible memory, for example, writing lists, organizing things in files, putting notices on notice boards and setting alarms. Even in a well-organized setting, things might be mislaid or forgotten because they were not seen to be important at the time they were encountered. These failures of memory have a cost, both in the time spent recovering (such as looking for mislaid documents) and in the time spent organizing things in the first place so that problems do not arise.

One current form of memory aid is the electronic personal organizer, which is similar in form to a hand-held calculator. Although such a device is capable of holding large amounts of information, each item must be entered, usually manually, so the user must both input the information and remember to do so.

Various other systems have recently been proposed to help the user recall past events as well as to provide reminders of future intentions. For example, in EP-A-0,495,622 to Lamming et al. there is described an activity-based information retrieval system which automatically captures and records certain aspects of the context in which a recorded event took place. The system relies on a variety of apparatuses for monitoring, recording and time-stamping various key aspects of human activity, from which a readable list of episodes, or 'activity diary' can be generated automatically. In one example, the system uses encoded identifiers, each intended to be carried by people working in the environment being monitored. One particularly convenient form of identifier is the "active badge" offered by Olivetti. This identifier takes the form of miniaturized circuitry in a housing able to be pinned or clipped to the clothing of the person to whom the identifier is issued. The circuitry is designed to emit pulse width modulated infra-red (IR) coded signals for a tenth of a second every 12 to 15 seconds. The signals, by their nature, have a range of about six meters, and will not travel through walls, which makes them very useful for keeping track of people moving between rooms in a normal working environment. In each of the rooms or corridors of interest would be positioned one or more sensors responsive to the IR signals. The sensors would be connected to a master station processor, which would have the task of polling the sensors for identification 'sightings'; processing the data (which would include decoding the signals to determine which person was within range of a specified sensor at the time of polling), and presenting the processed data in a visual format in the form of a diary. This diary, which correlates quite closely with human recollections of past episodes, can be used simply to stimulate further recall, or to identify an episode and its time of occurrence, or to show a set of episodes from different sets. The time may be used to locate the corresponding items in any other set of time-stamped data, such as a sequence of video frames or an audio record of a meeting.

A related system was disclosed in an article in The Sunday Times of London, U.K., 11 Feb. 1990, entitled "Computers acquire social skills", by Jane Bird. This mentioned the use of identity buttons to enable the computer to know who was where in the building at all times. Associated with the system is a network of microphones and/or video cameras capable of recording conversations. It gave the example of a copier in a room monitored by the computer. Upon the copier's developing a fault, a frustrated would-be user tries to recall what a colleague told him about how to cure the fault. The computer is interrogated to find the last time that the two people concerned were at the copier. Once this particular bit of information has been recovered, it is used to access the time-stamped audio records of what was said in the room containing the copier at that point of time. In this way, the inquirer has the opportunity of hearing again the conversation between him and his colleague.

The aforementioned systems have several practical limitations. These include the need on the part of the user to devote a lot of effort to identifying a particular time and place from the raw data, and the lack of precise episode definition from such data. Also the systems capture just the location of users, and not their activity or other significant episodes. These drawbacks would make the systems of relatively little practical value.

It is an object of the present invention to provide an improved memory aid system which requires minimum input from a user, and yet which is easier to use for retrieving information than to remember or find whatever it is that has been forgotten or mislaid.

SUMMARY OF THE INVENTION

According to the present invention, there is provided an information recording system comprising:

a plurality of objects, each object representing a human user or other entity identifiable by the system and each object comprising an agent, means for communicating between the agent and the agents of other ones of the objects, and, in communication with the agent, at least one of a database, a sensor, and a user interface;

the system including at least one database, at least one sensor, and at least one user interface;

at least part of the agent of at least one of the objects representing a human user being portable by the user, providing interaction with the user, and identifying to the system the location of the user;

the information comprising, for a given object, a chronological sequence of time-stamped facts in its database, each fact comprising an attribute and a value of that attribute for a given object at the time indicated by the time stamp; and the facts being automatically recorded in the database on the occurrence of physical or logical collocations of two or more of the objects.

According to another aspect of the invention, there is provided a method of searching a database in which data is organized as a set of threads, each thread comprising a chronological sequence of time-stamped facts, all of which relate to a single object and at least some of which also represent descriptors of other objects, each object representing a person or an identifiable entity, and each of the facts comprising an attribute and a value of that attribute for a given object, the method including displaying the sequence of facts of a selected thread, or the sequence of events defined by the coincidence of two or more threads, and moving selectively forward or backward in time through the displayed sequence of facts or events, and the method including enabling the selection, for subsequent display, of any one of the threads of a displayed event.

The invention also provides an apparatus for recording facts relevant to the activities of the user of the apparatus, including a database, a user interface, and means for receiving signals from external sources, the signals representing facts related to the sources; each of the facts being time-stamped and comprising an attribute and a value of that attribute for a given source at the time indicated by the time stamp, and the facts being automatically recorded in a chronological sequence in the database on the occurrence of physical or logical collocations of the apparatus and one or more of the sources; and the apparatus being operable through the user interface to enable the user to retrieve from the database a sequence of occurrences of a selected fact or pattern of facts.

Preferably, the apparatus of the preceding paragraph include means to enable manual entry of the facts or other information into the database, and is wearable by the user.

The invention may be employed to provide a memory prosthesis in the form of a highly portable device (e.g. a device worn like a watch) which records all kinds of information about the user's life, and provides a simple and rapid means of access to that information. The device receives and stores information from external sources ('objects') via, for example, a cellular communications network, or from signal generators identifying specific machines, places, or people carrying other ones of the same type of device. The data can either be stored in the memory of the device itself, or, for better protection against failure, in a central data repository of the system, with a fail-safe backup.

Data is gathered continuously with no attempt being made to categorize or filter it at the time of collection. This means that all the data is retained, so that items that might have been categorized as insignificant at the time of collection can later be retrieved. As a result there will be large quantities of data for the user to search. For the memory prosthesis to be usable, it must provide a mechanism for enabling the user to constrain the search and rapidly find the relevant information. This mechanism is supported by the data model described below.

The data consists of series of events which happen to each object in the system. Each object has its own "thread", a linear organization in time of the events occurring as the object encounters other objects. Access to the data is achieved by displaying sequentially, running either forwards or backwards in time, the series of events along a selected thread. Rapid searching is made possible by specifying events formed by the coincidence of several threads, or by changing from one thread to another at a event where the two threads intersect.

The memory prosthesis records all kinds of information about the user's life, and by providing a simple and rapid means of access to this information it can help the user to recall things that might otherwise be forgotten. All information in certain specified categories is gathered, without filtering, so that even things that might not have appeared important at the time of recording can later be recovered.

The following description, the drawings and the claims further set forth these and other objects, features and advantages of the invention.

DETAILED DESCRIPTION

A. Architecture

Figure 1:
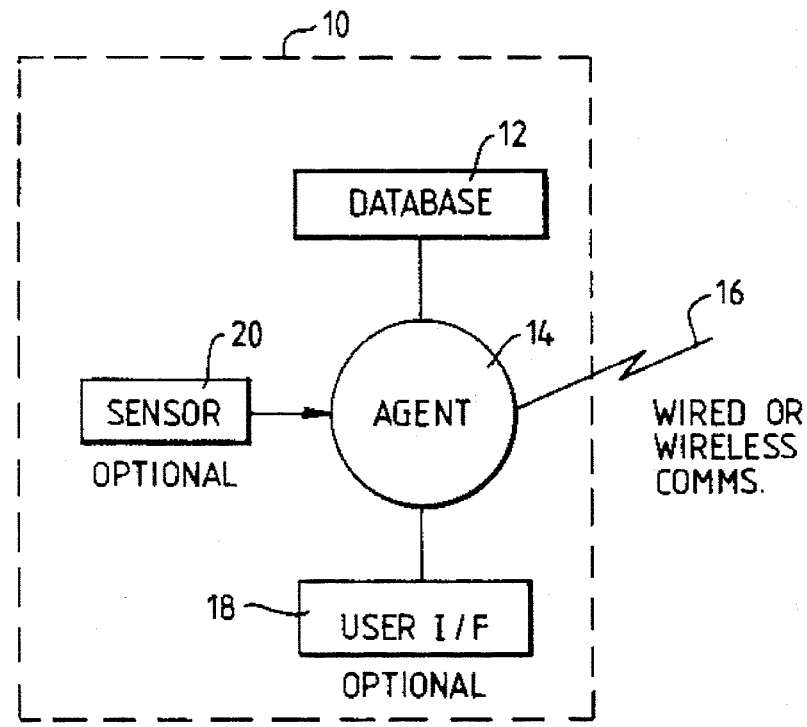
FIG. 1 is a diagrammatic representation of the elements which comprise an 'object', as defined herein.

Referring to FIG. 1, the basis of the information recording system comprises at least two "objects" 10 of the kind shown, which together define a domain. The domain may cover, for example, a room, a building, all the buildings within a group of buildings, or a larger area. An object 10 represents a person or another identifiable entity such as a location, an apparatus or machine, a vehicle, a piece of mail, some text, a number, a time. The system thus comprises a set of objects 10, within the domain, for which a history can be generated automatically. Each object 10 conforms to the architecture shown in FIG. 1. All objects 10 have a database 12 in which they store descriptions of the activities in which they were involved. A whiteboard might store the names of people using it, derived for example from active badge identifiers, and snapshots of its contents at periodic intervals. Associated with each object is an agent 14 which has three main functions: it manages the database 12; it exchanges information with other objects over a communications channel 16; it communicates with human users over a user interface 18 (UI) to answer queries using the database; finally, it collects data from its own sensors 20. While all objects 10 have an agent 14, a database 12, and a means 16 to communicate with other objects, they may not possess a UI if they do not provide an interface for querying their database. A room-conversation detection object is an example. Some objects 10 may not contain sensors if they obtain all their information from remote sources over the communications channel.

Figure 2:
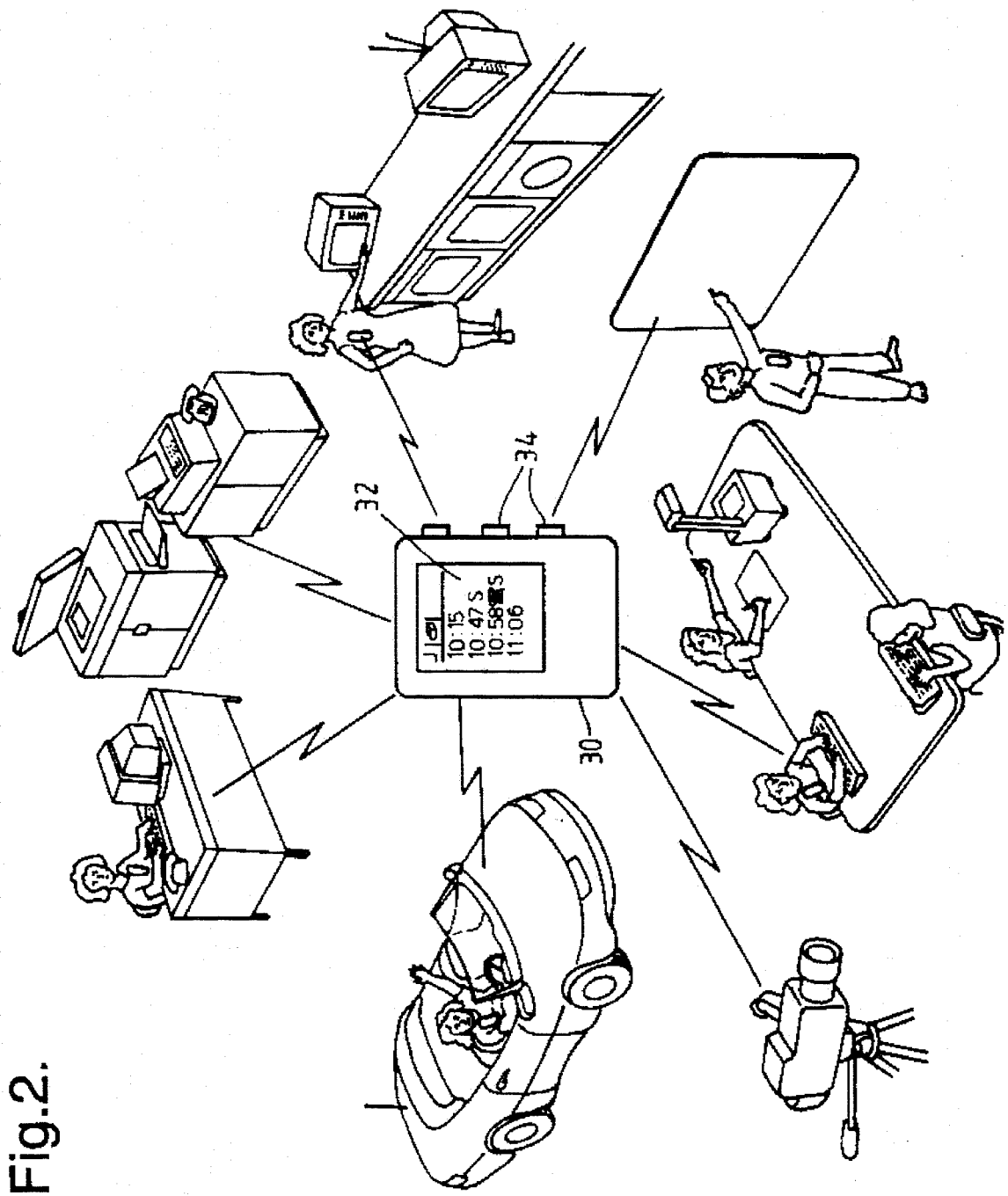
FIG. 2 is a pictorial representation of an example of a system in accordance with the invention.

Referring now to FIG. 2, there is shown a system containing a number of objects which form a domain including a personal, portable, computer 30 which may be described as a "tab." This tab includes an agent, a database, a UI which includes a screen 32 and control buttons 34, and communication means which are preferably wireless, such as radio or IR. Jane, the person whom the tab represents, carries or wears the tab as she moves around the domain and carries out various tasks. The tab here is the object which represents Jane. When she encounters (e.g. approaches, enters, or uses) one of the other objects, a signal between Jane's tab and the other object generates a time-stamped record in the database of Jane's tab (and possibly also in the database of the other object). The record includes the time of the encounter (the time-stamp), and identifies the primary object (Jane), an attribute of that object (e.g. location—"at"), and a value of that attribute (Jane's Office).

By way of example, let us assume that Jane enters her office one day at 10:15. Here, the record in her database will show "10:15 (time-stamp)—Jane (object)—at (attribute)—

Jane's Office (value of attribute)." The screen on her tab can use either words or icons to display this record, or a mixture of the two. If Steve enters Jane's office at 10:47, a record is generated to show that Steve and Jane are collocated in Jane's office. When Jane uses the telephone at 10:53 to call Bob, the object representing her has the attribute "using" and the value "telephone." The record will show Jane, Steve, and telephone being used by Jane (to call Bob), in Jane's office. Jane makes a note during the telephone call. This note may also be recorded in Jane's database, either automatically if she made it, say, on a workstation which is another of the objects in the system, or manually using her tab. Jane then finishes the telephone call, and Steve leaves her office.

If, many months later, and using the example just described, Jane wishes to recall the note she made during her telephone conversation, she can ask her tab to show her a list of all her telephone calls. This might be unmanageably long, so she might remember that she made the note while on the telephone at a time when Steve was in her office. Thus she could ask her tab to list for her all those occasions when she was using the telephone while Steve was in her office. This would considerably limit the search (assuming Steve was an infrequent visitor), and the tab screen would show just those (few) occasions which would include the one that Jane was seeking. She could then identify the note, for example by its time-stamp, and display it on her tab.

The objects shown in FIG. 2 have different configurations and requirements. It is most likely that all the human users will need a database and a UI, but much less likely that the other objects, like offices or machines, will need them. However, it is sometimes useful for machines to have both, so that records of who used which machine at what time can be kept and later reviewed.

The following definitions and explanations are provided to assist in understanding the invention.

B. DATA MODEL

"Information" is held in the database as a sequence of time-stamped facts.

Each "fact" consists of an object, an attribute and a value.

A "fact" represents the knowledge that the attribute of the object is the value.

The "time-stamp" indicates the time at which this fact became known.

The "sequence" is held in chronological order in a relational database.

An "object" represents either a person or any other entity which is identifiable by the system, such as a location, an apparatus or machine, a vehicle, a piece of mail, some text, a number, or a time.

An "attribute" indicates one of the possible properties that some object may possess, such as hair color, whereabouts, or size.

A "value" represents the particular value of an attribute, such as black for hair color, the kitchen for whereabouts, or large for size. (See Table 1 below).

TABLE 1

| Typical time-stamped facts in a database. | | | |
|---|---|---|---|
| Time | Object | Attribute | Value |
| 11:05:26 Mon 21st June 1993 | Steve | at | Kitchen |
| 11:37:13 Mon 21st June 1993 | Jane | at | Jane's Office |

TABLE 1-continued

| Typical time-stamped facts in a database. | | | |
|---|---|---|---|
| Time | Object | Attribute | Value |
| 11:39:22 Mon 21st June 1993 | Jane | at | Kitchen |
| 11:42:35 Mon 21st June 1993 | Jane | at | Jane's Office |
| 12:01:04 Mon 21st June 1993 | Jane | availability | Busy |
| 12:01:09 Mon 21st June 1993 | Kitchen | temperature | 22 Celcius |

The episode which Table 1 represents can be described as follows. Steve enters the kitchen at 11:05. Jane enters her office at 11:37, and then goes into the kitchen at 11:39. She returns to her office at 11:42, and is recorded as being "busy" (e.g. with a telephone call) at 12:01. Since no change has been noted in Steve's "at" attribute, it can be assumed that he remained in the kitchen throughout this period of time. It is possible to infer from this that while Jane was in the kitchen, Steve and Jane were collocated at 11:39. This inferred fact is shown in Table 2.

C. INFERENCE

An agent may apply "inference rules" to the information thus held, in order to establish other facts not directly recorded, such as when two people were in the same room, or the duration of a meeting.

Such "inferred facts" may be determined by the agent upon request, or determined in advance and held in the database on the same footing as ordinary facts.

Inferred facts may be used during inference, to produce further inferred facts. (See Table 2 below).

TABLE 2

| An extra inferred fact introduced, in italics | | | |
|---|---|---|---|
| Time | Object | Attribute | Value |
| 11:05:26 Mon 21st June 1993 | Steve | at | Kitchen |
| 11:37:13 Mon 21st June 1993 | Jane | at | Jane's office |
| 11:39:22 Mon 21st June 1993 | Jane | at | Kitchen |
| *11:39:22 Mon 21st June 1993* | *Steve* | *co-located* | *Jane* |
| 11:42:35 Mon 21st June 1993 | Jane | at | Jane's Office |
| 12:01:04 Mon 21st June 1993 | Jane | availability | Busy |
| 12:01:09 Mon 21st June 1993 | Kitchen | temperature | 22 Celcius |

D. PATTERNS

When a request for information is made to the agent, a pattern may be specified.

A "pattern" consists of either: a conjunction of patterns; a disjunction of patterns; a negation of a pattern; or an object.

Such a pattern filters the information yielded by the agent to include only those facts which conform to the pattern.

A fact conforms to a "conjunction" of patterns if it conforms to each of the conjoined patterns individually.

A fact conforms to a "disjunction" of patterns if it conforms to any one or more of the disjoined patterns.

A fact conforms to a "negated" pattern if it does not conform to the pattern which is negated.

A fact conforms to an "object pattern" if the fact mentions the object of the pattern.

E. SEARCH

In response to information request, the agent "searches" for particular facts by considering the whole of the sequence of facts and making those inferences possible, to find facts conforming to the supplied pattern.

In principle, the agent checks every fact, simple or inferred, for conformity with the pattern.

In practice, the agent need only consider those facts pertinent to the pattern—that is, the contents of the pattern may be used to inform and constrain the possibly huge search undertaken by the agent to reasonable dimensions.

For example, a pattern which specified that a particular person, place and day of the week must be mentioned, allows the agent to consider only those facts and inferred facts pertinent to that person, place and day, thus greatly reducing the scope of the required database search and the number of facts which must be tested for conformity to the pattern.

F. THREADS

If a pattern contains at least one object, then the only facts that the agent will yield are those pertinent to that object. Such a chronological sequence of facts may be considered a biography of the specified object, or "thread."

A simple user interface paradigm would be to keep at least one object in the pattern at all times, and display a thread for that object. Such a thread will mention other objects, such as locations or other people. One of these other objects may be selected by the user as the new focus, and the pattern used from then on would contain the new object. Thus a switch in perspective occurs, to the thread of the newly selected object—the biography displayed is now that of the new object.

Figure 3:
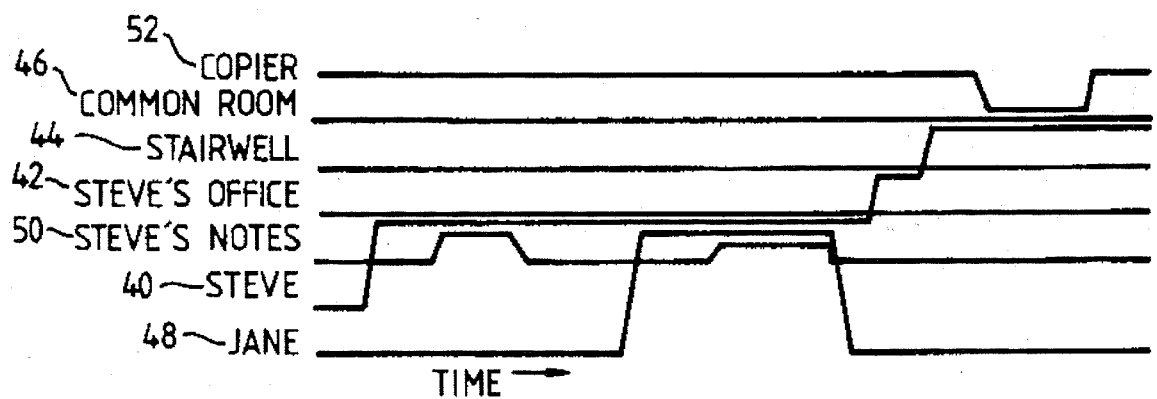
FIG. 3 is a diagrammatic representation of the threads of several objects.

The world is thus seen as consisting of a variety of objects, each one of which automatically generates an autobiography recording events in its "life". These objects could in principle be anything, but typical examples are people (at least, computers attached to them), offices, telephones, notebooks and workstations (see FIG. 2). The autobiography for each object consists of a series of events that happened to that object, each event being an encounter of this object with another. These events are organized linearly in time as a "thread". For example, as Steve walks around his thread 40 shows him in his office 42, then the stairwell 44, and then the common room 46 (see FIG. 3). Conversely, his office thread 42 shows him 40 enter, stay for a while and then leave. The stairwell thread 44 shows him 40 enter and leave and finally the common room thread 46 shows him arrive. A further thread 48 belonging to Jane shows her visiting Steve 40 whilst he is in his office 42. This visit also appears on Steve's own thread 40 and that of his office 42. During this period Steve interacts several times with his electronic notebook 50. Each interaction appears on the thread of the notebook 50 and also on Steve's thread 40 and the thread for the room in which he is using the notebook. Whilst he is in the common room 46, Steve uses the copier 52. This interaction also appears on his thread 40, and those of the common room 46 and copier 52.

Threads that run together indicate "collocation" of the objects that own the threads. The collocation could also be taken to mean some other sort of relationship such as "interacted with" (e.g. via telephone or workstation), thus representing a logical collocation rather than a physical one. The significant points recorded on a thread are the points where threads join together or split apart, indicating a transition from one state of affairs to another.

Users can retrieve information about events in their life by finding the relevant points in the threads structure. Starting from any point they can navigate around this structure by moving forward or back between events along a particular thread. For example, if Steve had mislaid some papers given to him by Jane during her visit to his office he could prompt his memory by looking on his thread and finding Jane's departure from his office. From here he could move along the thread to see the subsequent events: him leaving his office, entering and leaving the stairwell and entering the common room. He then sees that the next event on his thread records him using the copier and this reminds him that he left the papers on the table beside the copier.

The user can also switch onto another thread at a point where the current thread intersects it. For example, if Steve found someone's originals in the copier when he came to use it he could switch from his thread to that of the copier. By following back down the copier thread he could find the previous person who used the copier and hence return the originals.

These examples have been very simple, but in reality there will be a large number of events in any thread that is to be navigated. To simplify navigation the user can specify which particular events are of interest by giving a pattern to be matched. Such patterns can specify any combination of location, people, time or other objects. For example, if Steve specifies "in my office with my notebook with Jane" he will see only those occasions that match this pattern i.e. those occasions when he was in his office with Jane and made some notes. The actual notes, which may have been recorded in the database by the user, are linked to these events, thus allowing him to retrieve them.

Figure 4:
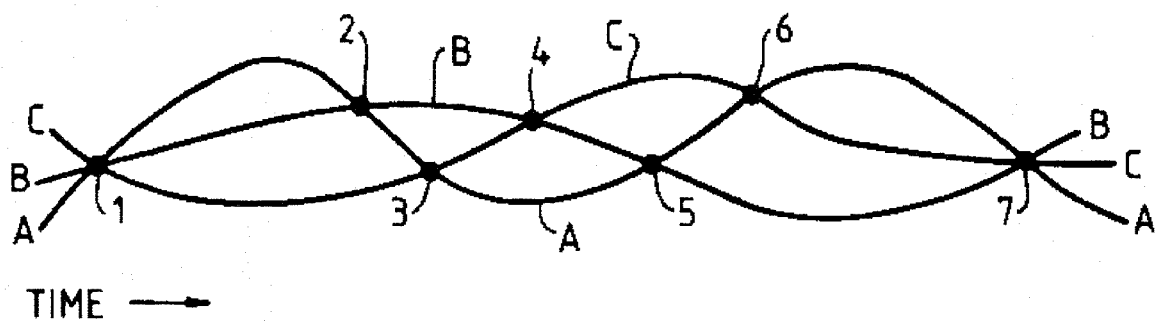
FIG. 4 illustrates a set of 'threads' to show how a user can navigate the information in a database.

By way of example of a user "navigating" the database using the threads model, reference is made to FIG. 4 in conjunction with Table 3. FIG. 4 shows a sequence of seven events, labeled in chronological order of their occurrence from 1 to 7. Each event comprises the conjunction (intersection) of two or more of threads A, B, and C. Event 1 shows a coincidence of threads A, B and C, event 2 involves only threads A and B, event 3 involves threads A and C, and so on. In searching the part of the database involving these events, the user might "browse" in the manner represented by way of example in Table 3. In the first step, he starts at event 1, moves forward (in time) along thread A and arrives at event 2. In step 2 he moves backwards along thread A and returns to event 1. In step 3 he changes to thread B. In step 4 he moves forward along thread B to arrive, on thread B, at event 2. In step 5 he moves forward along thread B to arrive at event 4. In step 6 he changes to thread C. In step 7 he moves forward along thread C to arrive at event 6.

TABLE 3

Example of navigating data in a threads model

| Step No. | Event | Search Direction | Thread | Result |
|---|---|---|---|---|
| 1 | 1 | Forward | A | 2 (on A) |
| 2 | 2 | Backward | A | 1 (on A) |
| 3 | 1 | Change to B | A | 1 (on B) |
| 4 | 1 | Forward | B | 2 (on B) |
| 5 | 2 | Forward | B | 4 (on B) |
| 6 | 4 | Change to C | B | 4 (on C) |
| 7 | 4 | Forward | C | 6 (on C) |
| . | . | . | . | . |

TABLE 3-continued

Example of navigating data in a threads model

| Step No. | Event | Search Direction | Thread | Result |
|---|---|---|---|---|
| . | . | . | . | . |
| . | . | . | . | . |
| . | . | . | . | . |
| 10 | 1 | Forward | A, B, C | 7 (on A, B, C) |
| 11 | 7 | Change to A,B | A, B, C | 7 (on A, B) |
| 12 | 7 | Backward | A, B | 5 (on A,B) |

Instead of navigating along single threads, as just described, the user may select patterns of threads, the simplest pattern being a conjunction of two or more threads. In step 10, search is requested by the conjunction of threads A, B and C. Starting at event 1, which is the first such conjunction, the user moves forward to event 7, which is the next such conjunction. In step 11, a change is made to a pattern consisting of the conjunction of threads A and B. In step 12, the user moves backwards through such patterns, the next occurrence of an A,B conjunction (going backwards) being event 5.

G. USER INTERFACE

Figure 5:
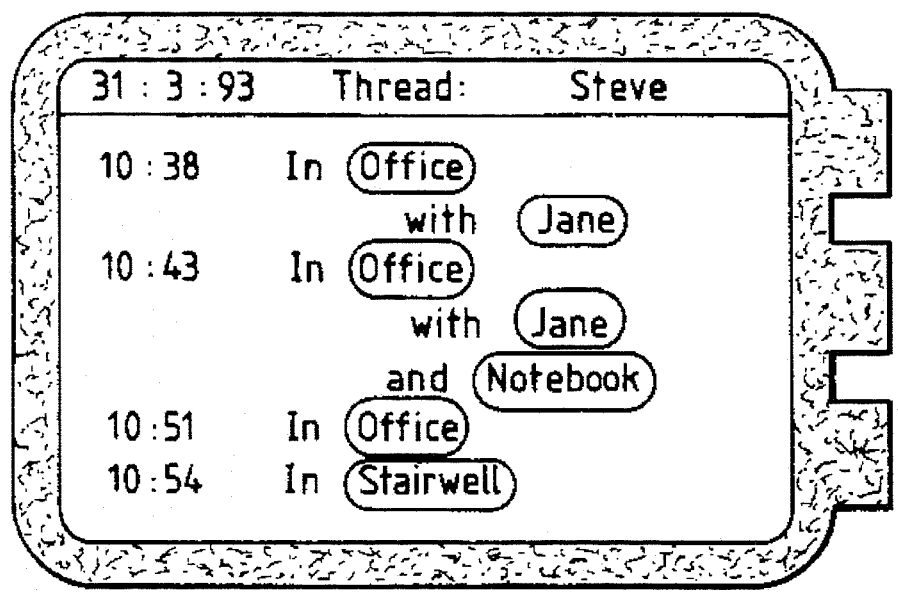
FIG. 5 shows an example of a user interface.

FIG. 5 gives one simple example of how the user interface might be for the memory prosthesis. The physical buttons on the side of the device can be used for moving forward or back through the current thread. Touching one of the on-screen buttons associated with intersecting threads switches to that thread.

The device shown in FIG. 5, in the form of a "tab", can be large enough for words to be used on its screen. However, a smaller device, such as one in the same form as a watch, will need to have its information displayed in a highly codified fashion. In this case, each episode or event listed occupies a single line containing a sequence of icons. The first item in each line represents the start time of the episode. It is followed by an activity indicator, representing the type of activity, such as a meeting, a time spent doing paperwork, or perhaps a vacation. The rest of the line contains a sequence of icons, each of which represents an object which the user encountered in the displayed episode. The top line of such a display contains information which applies to the whole of the history. It includes an icon representing the owner of the history displayed. It also includes the icons representing the filter pattern. The rest of the line contains the list of items that are common to all the episodes listed below it. This avoids repeating icons in each episode description, thereby economizing on screen space.

In reality any such user interface would be generally used as part of some other application, in a similar way to the Finder dialogues on the Macintosh, a product of Apple Computer, Inc. of Cupertino, Calif. It would provide a standardized way for the user to locate information using biographical information. The particular application would dictate what happened to the information retrieved.

Figure 6:
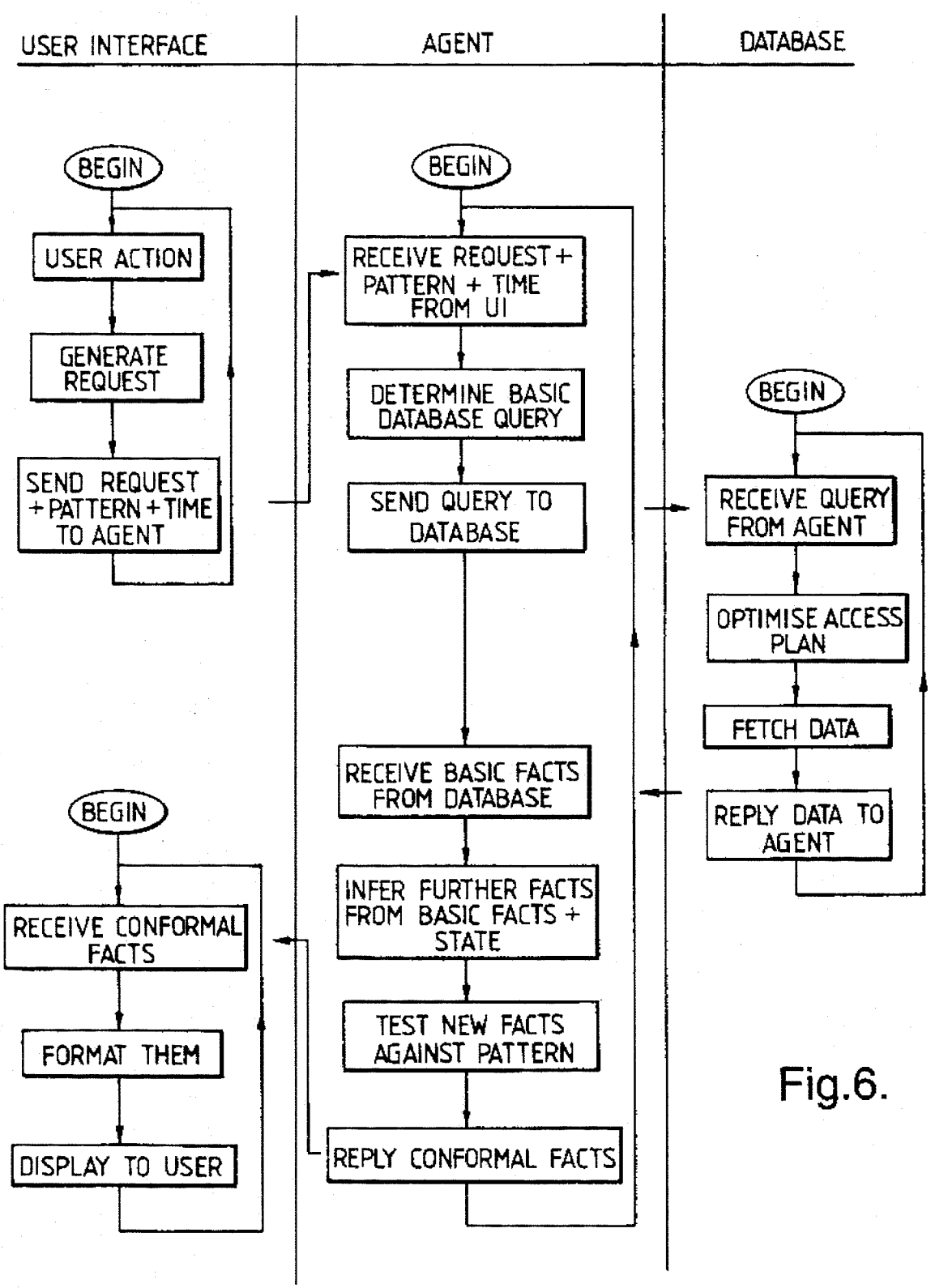
FIG. 6 is a flow chart showing how data is processed by one of the 'objects' used in the system of the invention.

Referring now to FIG. 6, there is shown a flow diagram illustrating the interactions of the main constituents—user interface 70, agent 80, and database 90—of an object which is part of the system of the invention.

If, for example, a user inputs a user action at step 71, a request is generated at step 72, and the request is sent at step 73, along with a time stamp of the request and a pattern, to the agent 80. The user interface may then await new user actions at step 71.

Agent 80 receives the request at 81, and determines the basic database query at step 82 necessary to service the request, and sends the query to database 90 at step 83.

Database 90 receives the query form the agent at step 91, and determines an optimized access plan at step 92. The data, in the form of facts, is fetched at step 93, and database 90 replies, with the data, to agent 80 at step 94. Database 90 may then await further queries from agent 80.

Upon receiving facts from database 90 at step 84, further facts may be inferred from the basic received facts and the state of the object in step 85, as described previously in relation to Table 2. The new facts may be tested against the original pattern in step 86 to determine facts which conform to the desired pattern. Conforming facts which are identified are returned to user interface 70 at step 87. Agent 80 may then return to set 81 to await further requests from user interface 70.

When user interface 70 receives conforming facts at step 74, the facts are appropriately formatted at step 75 and displayed to the user at step 76. The user interface may further await receipt of further conforming facts from agent 80 at step 74.

H. Miscellaneous

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

We claim:

1. An information recording and retrieval system, comprising:
   a database for storing information; and
   a plurality of objects, each representing a user or other entity identifiable by the system, each object representing a user being portable, each object comprising:
      an agent;
      means for communicating between said agent and agents of other objects; and
      means for communicating between said agent and said database; and
      a user interface for communicating between a user of said object and said agent;
   wherein said information to be recorded is organized as a set of threads, each thread comprising a chronological sequence of time-stamped facts all of which relate to a single object and at least some of which also represent descriptors of other objects, each fact including an attribute and a value of that attribute for said given object at the time indicated by said time-stamp, said facts being automatically recorded in said database upon physical collocation of two or more objects.

2. The system of claim 1, further including means to enable manual entry of said facts or other information into said database.

3. The system of claim 1, further including means for automatically recording facts in said database at predetermined times.

4. The system of claim 1, further including means for automatically recording facts in said database on occurrence of predetermined values of an attribute.

5. A method of searching for information using a first object that is portable, the first object including an agent, a database, a first means for communicating between the agent and other objects, a second means for communicating between the agent and the database, and a user interface for communicating between the agent and a user of the first object, the database being organized as a set of threads, each thread including a chronological sequence of time-stamped facts, each fact relating to a single object and at least some of which also represent descriptors of other objects, each object representing a person or an identifiable entity, and each of said facts comprising an attribute and a value of that attribute for a given object, the method comprising the steps of:

a) displaying the sequence of facts of a selected thread, or the sequence of events defined by coincidence of two or more threads in response to a first request from the user of the first object;

b) moving selectively forward or backward in time through the displayed sequence of facts or events in response to a second request to the user of the first object; and c) enabling selection, for subsequent display, of any one of said threads of a displayed event.

6. A portable apparatus for recording and retrieving facts relevant to the activities of a user of the portable apparatus, the portable apparatus including a database, a user interface, and means for receiving signals from external sources, said signals representing facts related to said external sources; each of said facts relating to a single object and at least some of said facts also including descriptors of other objects, each object representing a person or an identifiable entity; each of said facts further being time-stamped and comprising an attribute and a value of that attribute for a given source at the time indicated by said time stamp, and said facts being automatically recorded in a chronological sequence in said database on occurrence of physical collocations of said apparatus and one or said of the sources; and said portable apparatus being operable through said user interface to enable said user to retrieve from said database a sequence of occurrences of a selected fact or pattern of facts.

7. The apparatus of claim 6, further including means to enable manual entry of said facts or other information into said database.

8. The apparatus of claim 6, wherein said user interface enables said user to search by displaying sequentially occurrences of a selected fact or pattern.

9. The apparatus of claim 6, wherein each sequence of occurrences of a fact comprises a thread, wherein each of said facts is represented by the coincidence of two or more threads, and wherein said user can search said database by selecting one thread, or by selecting coincidence of a plurality of threads, or by moving from one thread to another.

10. The apparatus of claim 6, wherein said apparatus is wearable by the user.

11. A system for recording facts relevant to the activities of a user, comprising:

a plurality of external sources, each of said sources providing signals representing facts related to said external sources, each of said facts comprising a time-stamp, an attribute, and a value of said attribute at the time indicated by said time-stamp for the external source providing said signal; and a portable apparatus representing the user, comprising:
a database for storing said facts,
a user interface for operating said database and communicating with the user, and
means for receiving said signals representing said facts from said plurality of external sources;

wherein said facts are automatically recorded in a chronological sequence in said database on occurrence of physical of said apparatus with one or more of said plurality of external sources.

12. The system of claim 11 including a plurality of apparatuses, at least some of said apparatuses comprising at least some of said external sources.

13. The system of claim 11 wherein at least some of said external sources comprise a cellular communications network, enabling a device to determine its position in said network.

14. The system of claim 11 wherein said apparatus is in communication with a central data processing unit.

* * * * *